July 12, 1932. A. P. WARNER 1,866,586
FRICTION DEVICE
Filed March 5, 1928 2 Sheets-Sheet 1
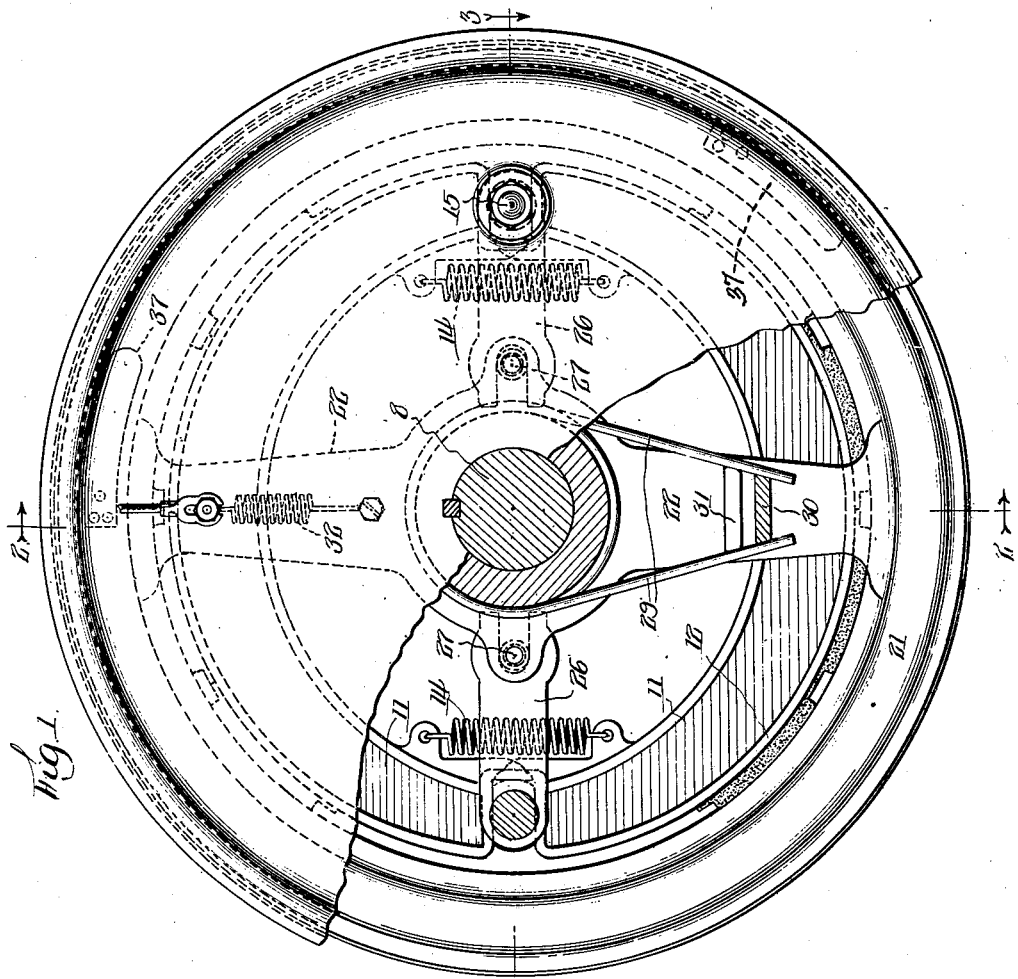
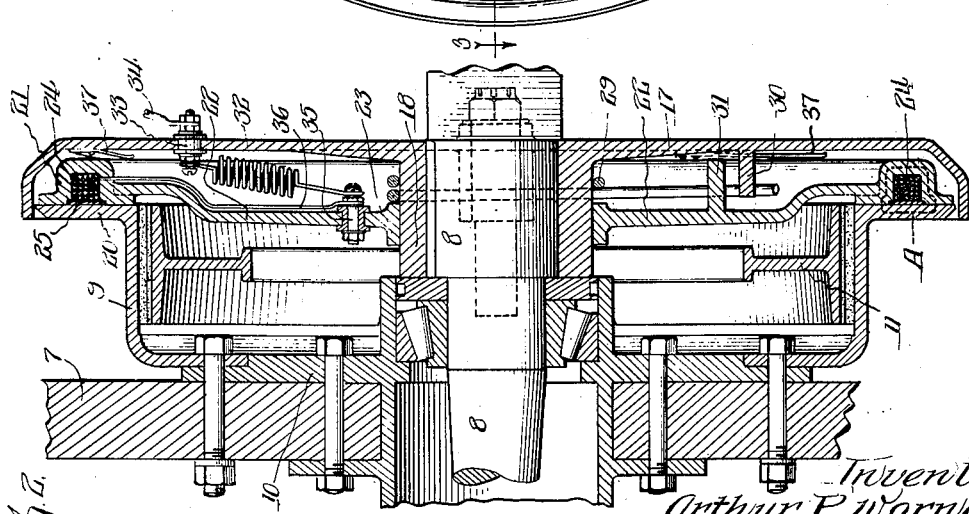

July 12, 1932.  A. P. WARNER  1,866,586
FRICTION DEVICE
Filed March 5, 1928  2 Sheets-Sheet 2
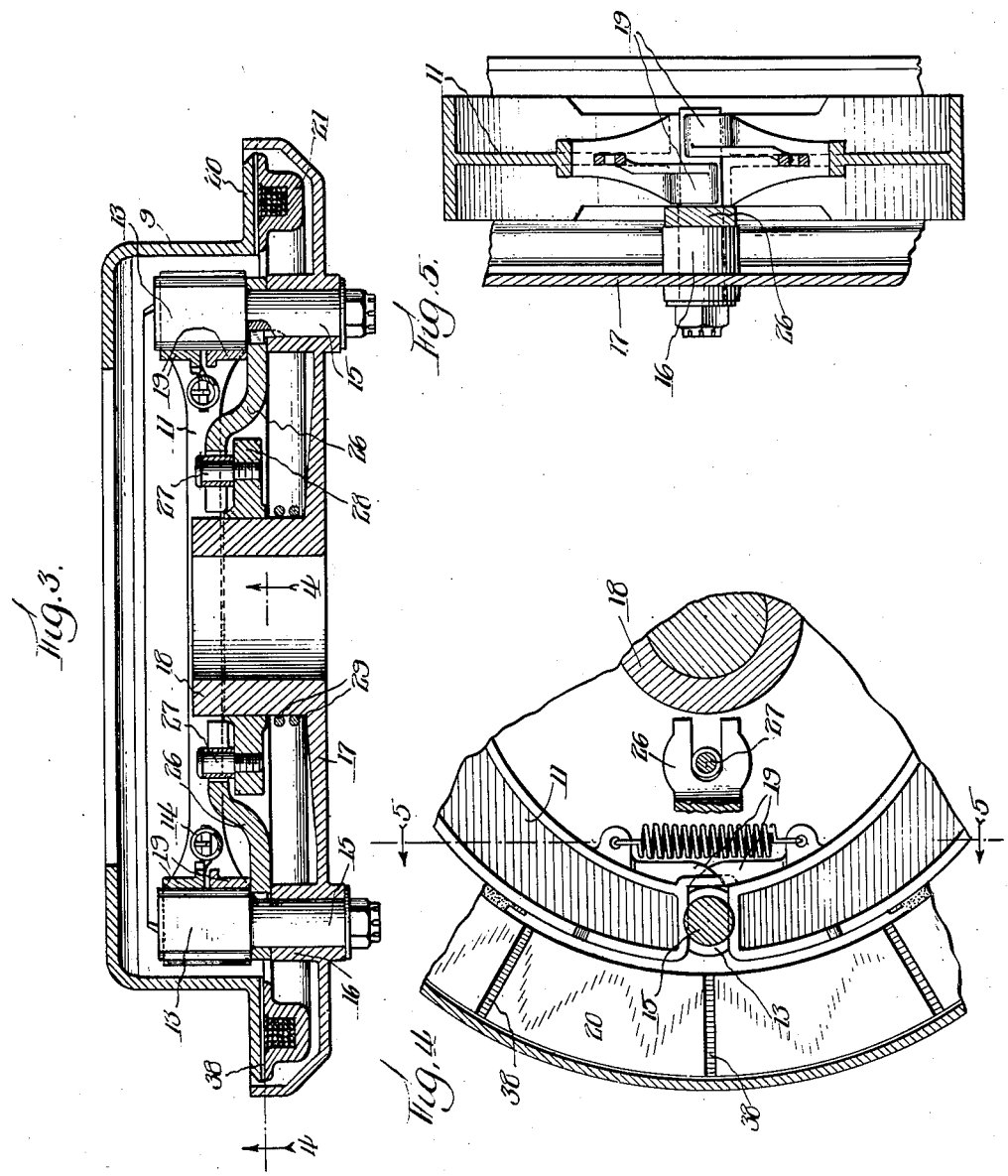
Inventor:
Arthur P. Warner,
By Lundahl, Parker & Carlson
Attys Patented July 12, 1932

1,866,586

UNITED STATES PATENT OFFICE

ARTHUR P. WARNER, OF BELOIT, WISCONSIN, ASSIGNOR TO WARNER ELECTRIC BRAKE CORPORATION, OF SOUTH BELOIT, ILLINOIS, A CORPORATION OF ILLINOIS

FRICTION DEVICE

Application filed March 5, 1928. Serial No. 259,050.

This invention relates to friction devices such as brakes and clutches and contemplates more particularly a device of the so-called momentum type.

Brakes of this class when applied to a vehicle generally include a pair of coacting friction elements which when brought into gripping engagement derive an actuating force from the motion or momentum of the vehicle whose motion is to be controlled, this force being augmented mechanically and applied to a friction brake associated with the wheels or other moving part of the vehicle.

One object of the present invention is to provide an electromagnetically controlled friction device of the above class which is simple and inexpensive in construction and which has its operating parts compactly arranged within and protected by a casing structure formed by an ordinary brake drum and a closure therefor.

Another object is to provide a drum-type of momentum brake having a pair of annularly arranged friction elements to be brought into gripping engagement by a force acting axially thereof and new and improved means for magnifying the force derived through the action of the coacting elements for application to the braking means proper.

Another object is to provide, in an electromagnetic friction device having annular magnetic elements, a novel means for maintaining uniform the reluctance of the magnetic circuit through the elements and a uniform wear on the friction faces of the elements.

Still another object is to provide in an electromagnetically controlled vehicle brake of the momentum type a novel means for establishing an electrical connection with the control magnet of the brake operator, the connection being of invariable and reliable character and at the same time allowing for freedom of movement of the parts of the operator.

Other objects and advantages of the invention will become apparent from the following description taken in connection with the accompanying drawings, in which:

Figure 1 is a side elevational view of a brake embodying the features of the present invention, a part of the enclosing casing being cut away to show the internal arrangement of the operating parts.

Figs. 2 and 3 are sectional views taken respectively along the lines 2—2 and 3—3 of Fig. 1.

Fig. 4 is a fragmental section as viewed along the line 4—4 of Fig. 3.

Fig. 5 is a sectional view along the line 5—5 of Fig. 4.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form illustrated in the drawings, the invention is embodied in a brake for a vehicle wheel 7 mounted through suitable bearings on a dead or stationary axle 8. The motion of the wheel is intended to be controlled by a friction brake of the expansible type including a drum 9 suitably mounted on the inner side of the wheel as by bolting the flanged end of the drum against the wheel hub 10. In the present instance that part of the brake which engages the drum to arrest the motion of the wheel comprises a pair of segmental shoes 11 arranged in end-to-end relation within the drum and having a friction covering 12 preferably composed of substantially rigid heat resisting material.

As a means for spreading the adjacent end-portions of the shoes apart and thereby press the coverings against the internal drum surface, two cam blocks 13 are provided having flattened sides against which the flattened ends of the shoes are normally held by contractile springs 14. Thus upon oscillation of either cam in either direction from its brake-released position, the shoes will be expanded.

The cam blocks 13 are rigid with the inner ends of rock shafts 15 journaled in bearing bosses 16 on a member 17 which forms with the drum a closed protecting casing. This member may be held stationary as by keying an inwardly extending hub portion 18 thereof to the axle 8. Thus the shafts 15 and the cam blocks serve to hold the brake shoes against rotation within the drum and at the same time allow for free expansion thereof.

To utilize the shafts 15 as means for holding the brake shoes centered relative to the drum, two lugs 19 are formed integrally with the shoes so as to overlap each other as shown in Fig. 5 when the brake is assembled. Each pair of lugs bears against the inner rounded end of the adjacent cam block 13 thereby holding the shoes against shifting movement in one direction.

The means for deriving the force which actuates the brake shoes comprises two coacting friction elements of relatively narrow radial width adapted to be brought into gripping engagement by the energization of a powerful electromagnet. One of these elements rotates during motion of the vehicle and in the present instance comprises a flange 20 carried externally of the drum and presenting an inwardly facing plane surface. The other element is also of annular form comprising a metallic ring 21 of magnetic material presenting a surface for co-operation with the flange surface.

To support the ring opposite the flange for oscillatory movement and also for engagement with the rotating friction surface by a force acting in an axial direction, the ring 21 is formed integral with the outer ends of two radially extending arms 22 integrally formed on a hub 23 which is rotatably mounted on the hub portion 18 of the closure member. By shaping the arms 22 as indicated in Fig. 2, the inner portions of the arms may be disposed within the drum.

The electro-magnetic winding for causing gripping engagement of the two elements comprises a plurality of turns of wire 24 disposed in a groove in the friction face of the ring 21, a ring 25 of non-magnetic material being set in the ring 21 to separate the magnetic poles.

When the winding is energized, the flux produced will flow in circuitous paths as indicated by dotted line A in Fig. 2 thereby causing gripping engagement of the rings 21 and 25 and the flange 20. If the flange is being rotated at this time, the ring will be carried forwardly therewith thereby making available at the ring an actuating force proportional to the degree of energization of the winding.

The actuating force thus derived is magnified and transmitted to each of the expanding cams 13 by a mechanical connection including the two arms 22 and a pair of crank arms 26. In the present instance, each crank arm is substantially shorter than the radial distance between the hub 18 and the rock shafts 15 and is keyed or otherwise fixed to one rock shaft between the cam thereon and the boss 16 so as to extend along a radius of the drum (Fig. 1) when the cam is in brake-released position, the free end of the arm being at all times within the circumference defined by the drum. To provide for oscillation of the cranks whenever the ring 21 moves angularly, the inner end of each crank, which is preferably shaped as shown in Fig. 3, is bifurcated and straddles a roller stud 27 on a short arm 28 integrally formed on the hub 23. The arms 22, the hub 23 and the arms 28 constitute in effect two bell-crank levers adapted to swing about the drum axis while each crank 26 and the cam 13 associated therewith constitute a lever receiving an actuating force from the short arms of the bell-cranks through a direct connection therewith. A powerful force-multiplying connection is thus provided for transmitting the power derived at a point near the periphery of the drum to the ends of the brake shoes which are also located near the drum periphery.

All of the parts of the force-augmenting connections are disposed within the circumference of the drum and so compactly arranged that the brake as a whole is of small axial dimension and the operating parts are all enclosed and protected by the drum and the closure plate. Wear and strain on the parts are minimized by arranging the force-augmenting connections for the separate cams in symmetrical relation to the axle.

From the foregoing it will be apparent that when the magnet is drawn into gripping engagement with the flange 20 by energization of the winding 24, the ring 21 will be carried along with the flange. This actuates the expanding cams to take up any clearance between the drum and the shoes and presses the latter against the drum with a force equal to the frictional force available at the magnetic ring multiplied by the leverage obtained through the medium of the bell-crank connections. Only a small fraction of one revolution of the ring is required for this purpose after which the ring slips relative to the flange, the brake being held set so long as the winding remains energized.

To effectually restore the magnet and force-multiplying connections to brake-released position after de-energization of the winding, a spring 29 of the hair-pin type may be employed. Herein this spring encircles the hub 18 and has two arms bearing against opposite sides of two lugs 30 and 31 mounted respectively on the stationary closure member 17 and on the adjacent swinging arm 22. During the movement of the magnet ring in either direction to set the brake, the lug 31 operates to stress one of the spring arms while the lug 30 serves to hold the other spring arm stationary. As soon as the winding is deenergized, the arm then under stress restores the magnet and the operating connections to normal position.

The winding 24 is intended to be variably energized from any suitable source of electric current such as a vehicle storage battery. In the present instance, the connections with the terminal ends of the winding are in one instance through a grounded conductor including the operating parts of the brake and in the other instance through an insulated conductor which allows for oscillation of the magnet ring. The latter connection includes a resiliently expansible and contractible coil of wire 32 pivotally anchored at one of its ends on the inner end of a binding post 33 stationarily mounted upon and extending through the closure member 17 at a substantial distance from the axle 8. A flexible connector 34 leading to the source of potential may be attached to the binding post 33. The coil 32 extends radially toward the axle and is pivotally anchored at its other end on an insulated post 35 connected by a conductor 36 to the winding 24. Because of its resiliency the coiled connector will be extended during movement of the magnet structure in either direction but will return to its normal shape when the brake is released, thus avoiding any danger of short-circuiting the magnet winding by contact with the metal parts of the brake. By locating the movable end of the connector coil close to the drum axis, a coil of substantial length may be employed and wear and strain thereon minimized. This type of connector is extremely reliable in character and of substantially constant resistance.

Intimate association of the magnet and the flange armature so as to provide for high conductivity of the magnet is accomplished by continuously urging the magnet structure into contacting engagement with the armature at a plurality of annularly spaced points. For this purpose, a plurality of leaf-springs 37 are anchored to the closure member 17 so as to bear against the back of the magnet ring 21 at all times.

By utilizing a plurality of individual spring means acting at spaced points around the magnetic elements, wear at their friction surfaces due to the continuous contact produced by the springs is efficiently distributed and the surface of the oscillatory friction element is maintained substantially flat. In this way maximum efficiency of the magnet is assured. Moreover the reluctance of the magnetic circuit throughout the entire circumference of the magnetic elements is maintained uniform both when the magnet is energized and when it is deenergized and is not changed as a result of lateral wobbling of the rotatable friction element.

As a means for preventing the accumulation of dirt or metal particles on the surfaces of the friction elements, the rotating flange 20 is formed with transverse grooves 38 (Fig. 4) opening at the periphery of the flange. Any extraneous particles coming onto the friction surfaces of the elements would be carried forwardly by the rotation of the flange and would be entrapped in the first groove 38 encountered. The particles are thrown outwardly by centrifugal force. Thus the friction surfaces are kept clear at all times and the conductivity of the magnet flux circuits maintained.

It has been found that the cleaning action effected by the grooves 38 reduces to a minimum the frictional wear which takes place at the engaging surfaces of the magnetic elements and prevents scoring of the surfaces. The provision of such cleaning grooves is particularly important where, as in the present instance, the coacting friction elements are maintained continuously in mechanical contact as a result of which extraneous particles of metal or the like, coming onto the friction surfaces, would tend to produce excessive wearing.

The arrangement of the radial slots 30 for the purpose of throwing out extraneous material coming onto the friction surfaces is disclosed and generically claimed in my co-pending divisional application, Serial No. 428,903, filed February 17, 1930.

I claim as my invention:

1. A vehicle brake of the momentum type comprising, in combination, a rotatable drum, a pair of segmental brake shoes arranged in end-to-end relation within said drum, a stationary member closing the open end of said drum, means mounted on said member for oscillation about the drum axis and providing two bell-crank levers having long and short arms disposed substantially in perpendicular relation with the long arms substantially in alinement, a friction ring carried by said long arms, means rotating with the drum and providing a friction surface for engaging said ring to produce angular movement of the latter, expanding devices for spreading the opposite end portions of said shoes each comprising a cam associated with two adjacent end portions of said shoes and a crank rigid with said cam, and means pivotally connecting the free end of each crank to the short arm of one of said bellcranks.

2. An electric vehicle brake of the momentum type comprising, in combination, a rotatable drum, a stationary closure member at the open end thereof, braking means within said drum, actuating mechanism for said braking means adapted to derive an actuating force from the momentum of the vehicle and to apply said force to said braking means, said mechanism including an electromagnet having a limited angular movement during operation of said brake, and means providing an insulated electrical conductor leading to said winding including a resiliently, expansible and contractible coil having one end stationarily mounted on said member at a substantial distance from the drum axis and its other end mounted for angular movement with said magnet and located substantially closer to said drum axis than said stationary end.

3. An electric vehicle brake of the momentum type comprising, in combination, a rotatable drum, a stationary member co-operating with said drum to provide a closed casing, brake means co-operating with said drum, an actuating means for said brake means adapted to derive an actuating force from the momentum of the vehicle and to apply said force to said brake means, said mechanism including an electromagnet which oscillates out of and into a normal brake-released position during setting and releasing of the brake, and means providing an insulated electrical conductor leading to the winding of said magnet and including a resilient coil of wire within said casing, one end of said wire having a fixed mounting, the other end being adapted for angular movement with said magnet.

4. A vehicle brake comprising, in combination, a rotatable drum, a pair of segmental shoes disposed within said drum in end-to-end relation, two expanding cams, one located between each pair of end portions of said shoes, actuating means for said cams, and overlapping lugs formed at the ends of said shoes and cooperating with said cams to hold said shoes centered relative to said drum.

5. A momentum brake for a vehicle wheel comprising, in combination, a drum which rotates with said wheel, friction braking means co-operating with said drum and having adjacent end portions, and an actuating mechanism for spreading said end portions apart to set the brake, comprising a pair of annularly arranged elements of narrow radial width and substantially the same diameter as said drum and arranged for frictional gripping engagement with each other by a force acting axially thereof, one of said elements being rotatable with the drum, electromagnetic means adapted when energized to cause gripping engagement of said elements and a force augmenting connection between said other element and said brake means, all of the parts of which are disposed wholly within the confines of the circumference of said electromagnetic means.

6. An electric vehicle brake of the momentum type comprising, in combination, a rotatable drum, a stationary means cooperating with said drum to form a closed casing, braking means cooperating with said drum, an actuating means for said braking means adapted to derive an actuating force from the momentum of the vehicle and to apply said force to said brake means, said mechanism including an electromagnet which oscillates out of and into a normal brake-released position during setting and releasing of the brake, and means providing an insulated electrical conductor leading to the winding of said magnet including a wire within said casing with one end carried by said magnet, the other being anchored to said stationary means at a point nearer the drum axis than said oscillatory end.

7. An electromagnetically controlled operator for a friction brake combining means deriving an actuating force from the momentum of a part to be braked including an electromagnet mounted for angular movement away from a normal brake-released position to apply the brake, a non-rotatable member, and means providing an insulated energizing circuit for the winding of said magnet including a resiliently extensible and contractible element stretched between said magnet and said members and placed under sufficient initial stress that it will remain taut throughout the range of movement of said electromagnet whereby to maintain the conductor leading to said magnet out of contact with the adjacent parts of the brake structure.

8. In a mechanism of the character described, the combination of a friction gripping means, means providing an annular friction surface, an annular friction element mounted for axial gripping engagement with said annular surface and adapted by movement away from the normal released position to actuate said gripping means, an electromagnetic winding adapted when energized to produce gripping engagement of the co-acting annular surfaces, and means acting at a plurality of points annularly spaced around said element to exert axially directed forces acting to maintain continuous mechanical contact between the coacting friction surfaces around the entire circumference thereof.

9. In a mechanism of the character described, the combination of a pair of axially engageable friction elements having coacting annular surfaces, an electromagnetic winding carried by one of said elements and adapted when energized to produce gripping engagement of the coacting surfaces of said elements, and a plurality of individual spring means arranged in annularly spaced relation about said elements and acting to urge the elements toward each other to maintain their friction surfaces in continuous mechanical contact whereby to minimize the reluctance of the magnetic circuit through the elements.

In testimony whereof, I have hereunto affixed my signature.

ARTHUR P. WARNER.